Dec. 3, 1940.                H. W. DIETERT                2,223,408
                          PYROMETER STRUCTURE
                   Filed June 19, 1939        2 Sheets-Sheet 1

INVENTOR.
HARRY W. DIETERT
BY
ATTORNEYS

Dec. 3, 1940. H. W. DIETERT 2,223,408
PYROMETER STRUCTURE
Filed June 19, 1939 2 Sheets-Sheet 2
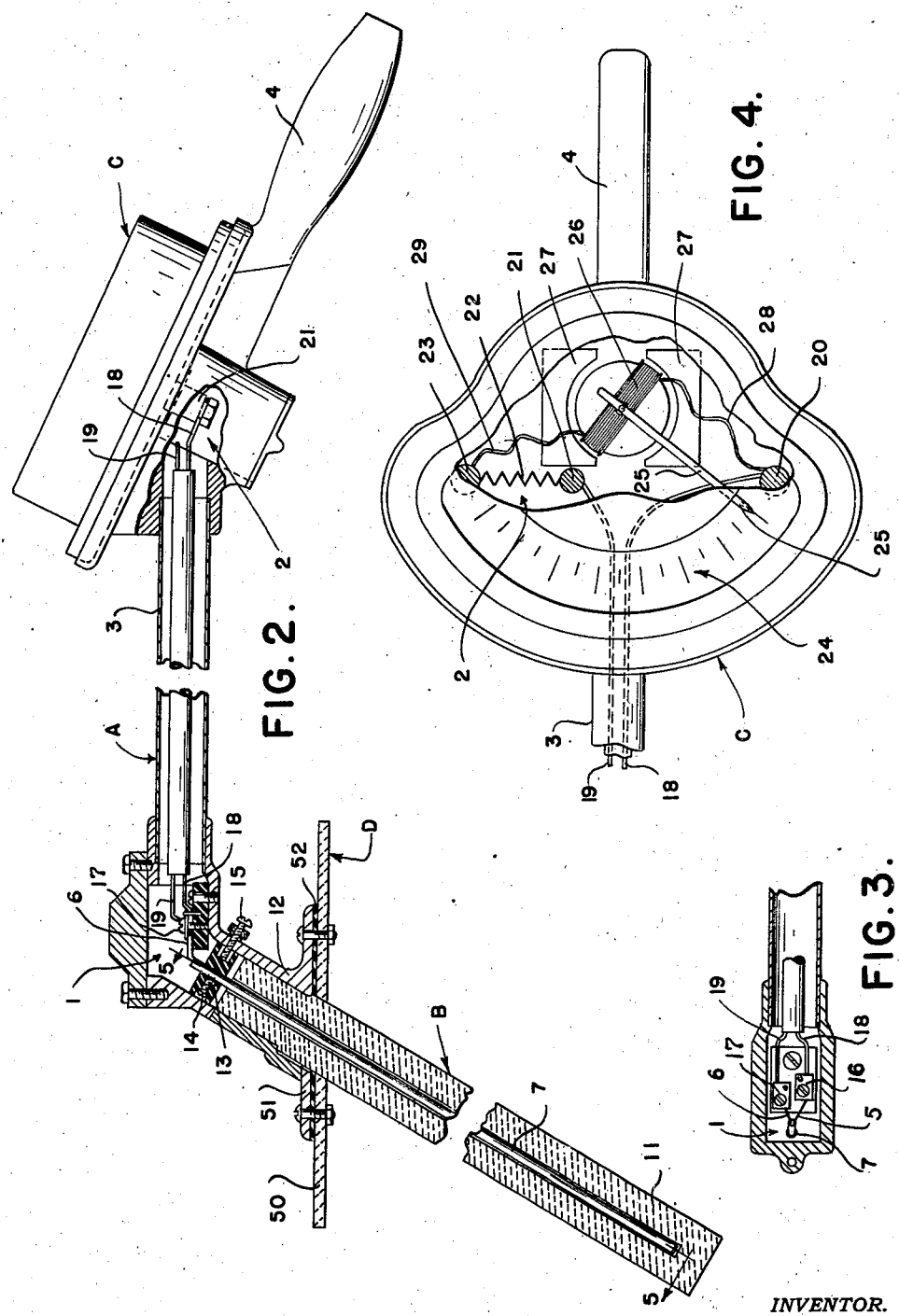
INVENTOR.
HARRY W. DIETERT
BY
ATTORNEYS Patented Dec. 3, 1940

2,223,408

UNITED STATES PATENT OFFICE 2,223,408

PYROMETER STRUCTURE

Harry W. Dietert, Detroit, Mich.

Application June 19, 1939, Serial No. 279,962

7 Claims. (Cl. 136—4)

This invention relates generally to instruments for measuring the temperature of molten metal such as molten grey and white iron and refers more particularly to immersion instruments of this type having a thermocouple and a meter.

Usually at predetermined intervals of time, preferably every half hour, the thermocouple is inserted for a depth of three to six inches in the molten metal in a ladle from a cupola to obtain on the meter of the instrument the correct reading of the temperature of the molten metal. Thus, a very valuable guide for controlling the operation of the cupola will be maintained.

However, in the past the hot gases from the molten metal have attacked the thermocouple and have changed the composition of the thermocouple elements or wires so that the calibrations thereof have been affected or impaired. As a result, the reading was inaccurate.

Therefore, one of the essential objects of the present invention is to provide such instruments with efficient means for protecting the thermocouple elements from the gases at elevated temperatures, for example, from 500° F. up so the thermocouple will retain its calibration for its entire life.

Another object is to provide an instrument wherein the thermocouple is constructed in such a way that the molten iron and slag will not adhere excessively thereto.

Another object is to provide a compact, portable instrument that is light in weight, easily handled, and accurate in operation.

Other objects, advantages and novel details of construction of this invention will be made more apparent as this description proceeds, especially when considered in connection with the accompanying drawings, wherein:

Figure 2 is a side elevation, partly in section, of the construction shown in Figure 1;

Figure 3 is a fragmentary plan view of a portion of Figure 2;

Figure 4 is a fragmentary plan view of another portion of Figure 2, with parts broken away for the sake of clearness;

Figure 1:
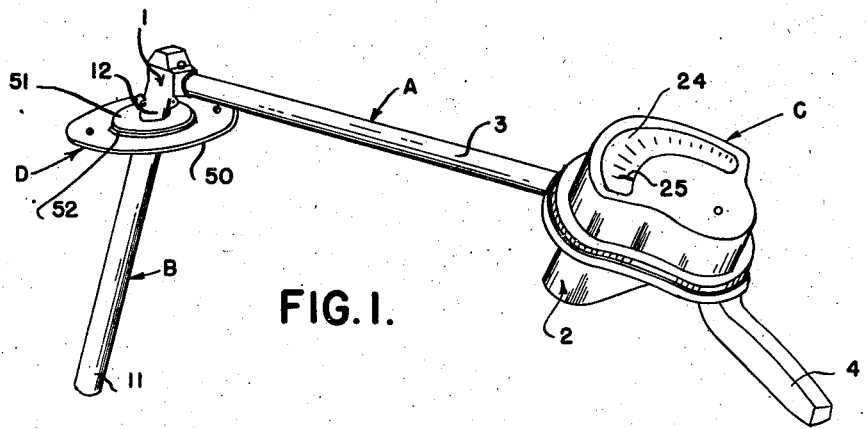
Figure 1 is a perspective view of a pyrometer embodying my invention.
Figure 5:
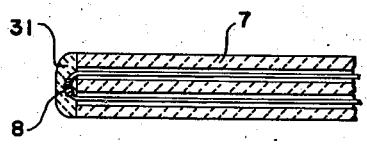
Figure 5 is an enlarged section taken substantially on the plane indicated by lines 5—5 of Figure 2.
Figure 6:
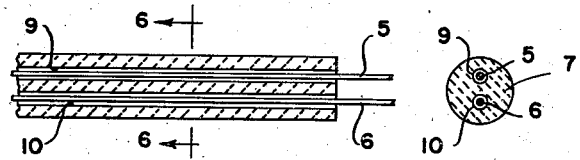
Figure 6 is a section taken substantially on the line 6—6 of Figure 5.

Referring now to the drawings, A is the frame, B is the thermocouple, and C is the meter of a device embodying my invention.

As shown, the frame A comprises a pair of spaced junction boxes 1 and 2, an intermediate tube 3 terminally connected to said boxes, and a handle 4 projecting rearwardly from the junction box 2.

The thermocouple B extends downwardly at a slight angle from the junction box at the outer end of the frame so as to be readily insertable into molten metal in a ladle (not shown) from a cupola, while the meter C is mounted on the junction box 2 at the inner end of the frame so as to be readily readable by the operator.

In the present instance the thermocouple elements preferably comprise a wire 5 of platinum and a wire 6 of platinum rhodium. These dissimilar metals have different E. M. F. potentials at elevated temperatures and are received within a ceramic tube 7 having low thermo-expansion characteristics. As shown, the wires 5 and 6 are secured together at the lower end of the tube 7 to provide a junction 8, while the tube 7 is provided throughout its length with two laterally spaced longitudinally extending bores 9 and 10 for the wires 5 and 6. Preferably the lower end of the tube is sealed about said junction 8 to protect the wires from the hot gases from the molten metal.

Receiving and protecting this tube 7 is a tube 11 of carbon or of ceramic or carbon base materials such as graphite or graphite clay. The lower end of this tube 11 is also closed.

When assembled, the open upper end of the outer tube 11 is clamped in a tubular part 12 of the junction box 1, and the open upper end of the inner tube 7 extends upwardly above the open end of the outer tube 11 and is held in place by a collar 13 and set screws 14 and 15, respectively, within the tubular part 12 of the junction box. The wires 5 and 6 project upwardly from the open end of the tube 7 and are connected to suitable terminals 16 and 17 in the junction box.

Extending from the terminals 16 and 17 are compensating leads 18 and 19 that extend longitudinally of the tube 3 to terminals 20 and 21, respectively, in the junction box 2. Preferably the terminal 20 constitutes one post for the meter, while the terminal 21 is connected by a suitable resistance coil 22 to the other post 23 for the meter. As shown, the meter is conventional in construction and has a dial 24 and a pointer 25 movable over said dial. As usual, the pointer 25 is carried by a coil 26 rotatably mounted within the field of a permanent magnet 27 and connected by wires 28 and 29 to the posts 20 and 23, respectively.

Thus, when the thermocouple B is inserted into molten metal in a ladle from a cupola, the wires 5 and 6 produce an electromotive force (E. M. F.) proportional to the heat to which the junction 8 of the wires of the thermocouple is subjected. The movement of the pointer 25 over the dial 24 of the meter is proportional to the E. M. F. applied to it from the thermocouple via the compensating leads 18 and 19. Consequently, the movement of the pointer is proportional to the heat to which the thermocouple is subjected. In view of this, the dial 24 is calibrated in degrees Fahrenheit to indicate the temperature of the molten metal.

In the process of construction the wires 5 and 6 are first secured together at one end to provide the junction 8. The free ends of the wires are then inserted into and through the bores 9 and 10 in the tube 7 until the junction 8 is at one end of the tube. This end is then sealed by a ceramic mixture 31, for example, a mixture of silica and aluminum, which is preferably fused by an electric arc or high temperature flame upon said end of the tube about the junction 8.

Figure 7:
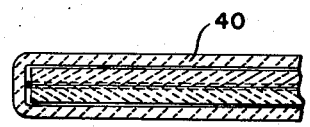
Figure 7 is a longitudinal section similar to Figure 5, but showing a modification of the invention.
Figure 8:
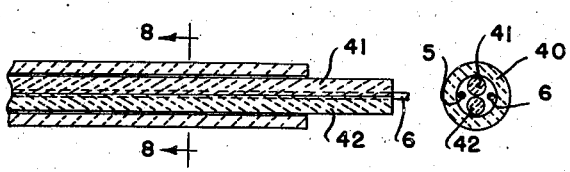
Figure 8 is a section taken substantially on the line 8—8 of Figure 7.

As an alternative, a hollow tube 40 of fused quartz or other ceramic material may be used as a housing for the wires 5 and 6. As illustrated in Figures 7 and 8, the lower end of this tube 40 is sealed, and the wires 5 and 6 are separated in the tube by two solid rods 41 and 42 of fused quartz. Preferably these rods 41 and 42 are arranged side by side and project approximately one-half inch above the upper end of the tube 40 so that they may be readily grasped and removed. As shown, the combined diameters of said rods are substantially equal to the inside diameter of the tube 40 whereby the rods are in engagement with opposite sides of the tube while in engagement with each other.

Thus, from the foregoing it will be apparent that two important steps have been taken to protect the thermocouple elements 5 and 6 from the hot gases. First, the lower end of the tube 7 containing these elements is sealed regardless of whether such tube has one or two bores, and, second, the tube containing these elements is provided with an outer protecting tube 11 which is constructed to withstand the action of the molten metal temperature. As a result of this combination a cheaper outer tube may be employed.

If desired, a shield such as D may be provided at the lower end of the tubular part 12 of the junction box 1 to keep the heat from the molten metal going up into the junction box 1 and tube 3. Preferably this shield D comprises a relatively hard disk 50 of insulating material and is bolted to a metal flange 51 of the tubular part 12. A layer 52 of relatively soft insulating material is employed between the disk 50 and flange 51 to complete the assembly.

What I claim as my invention is:

1. In an instrument of the class described, a hollow tube of ceramic material having a sealed immersion end, a removable partition of ceramic material extending lengthwise of the interior of said tube and terminating short of the sealed immersion end thereof, said partition consisting of two solid rods arranged side by side, the combined diameters of said rods being substantially equal to the inside diameter of the tube whereby said rods are in engagement with said tube at diametrically opposite sides thereof while in engagement with each other and divide the tube lengthwise into two chambers, and thermal elements having different E. M. F. potentials extending lengthwise of the interior of said tube, one in each chamber, and provided between the sealed end of the tube and the adjacent end of the partition with a junction.

2. In an instrument of the class described, a hollow tube of ceramic material having a sealed immersion end, a removable partition of ceramic material extending lengthwise of the interior of said tube and terminating short of the sealed immersion end thereof, said partition consisting of two solid rods arranged side by side, the combined diameters of said rods being substantially equal to the inside diameter of the tube whereby said rods are in engagement with said tube at diametrically opposite sides thereof while in engagement with each other and divide the tube lengthwise into two chambers, thermal elements having different E. M. F. potentials extending lengthwise of the interior of said tube, one in each chamber, and provided between the sealed end of the tube and the adjacent end of the partition with a junction, and an outer protecting tube of carbon and ceramic material receiving the sealed immersion end of the tube aforesaid and having a sealed immersion end.

3. In an instrument of the class described, a thermocouple comprising a hollow tube having low thermo-expansion characteristics, said tube having a sealed immersion end, thermal elements having different E. M. F. potentials extending lengthwise of the interior of said tube and having a junction at the immersion end thereof, and means for insulating said thermal elements from each other consisting of two solid rods of ceramic material extending lengthwise of the interior of said tube, said rods being arranged side by side between said thermal elements and throughout their length being in engagement with each other and in engagement with diametrically opposed sides of said tube, said rods normally projecting beyond the other end of said tube so as to be accessible for removal purposes.

4. In an instrument of the class described, a thermocouple having a hollow tube provided with a sealed immersion end, thermal elements having different E. M. F. potentials extending lengthwise of the interior of said tube and having a junction at the immersion end thereof, and means within said tube for separating the thermal elements from each other consisting of two rods of fused quartz arranged side by side within the tube between the thermal elements, said rods terminating short of the junction, the combined diameters of the rods being substantially equal to the inside diameter of the tube so that the rods engage opposite sides of the tube while in engagement with each other.

5. In an instrument of the class described, a thermocouple having a hollow tube provided with a sealed immersion end, thermal elements having different E. M. F. potentials extending lengthwise of the interior of said tube and having a junction at the immersion end thereof, and means within said tube for separating the thermal elements from each other consisting of two rods of fused quartz arranged side by side within the tube between the thermal elements, said rods terminating short of the junction and projecting outwardly from the tube so that they may be readily grasped and removed, the combined diameters of the rods being substantially equal to the inside diameter of the tube so that the rods engage opposite sides of the tube while in engagement with each other.

6. In an instrument of the class described, a thermocouple having a hollow tube provided with a sealed immersion end, thermal elements in said tube and having a junction at the immersion end thereof, and means for separating said thermal elements from each other, consisting of removable rods of refractory material between the thermal elements within said tube, the combined diameters of said rods being substantially equal to the inside diameter of said tube whereby said rods engage opposite sides of said tube while in engagement with each other.

7. In an instrument of the class described, a thermocouple comprising a hollow tube having low thermoexpansion characteristics, said tube having a sealed immersion end, thermal elements having different E. M. F. potentials extending lengthwise of the interior of said tube and having a junction at the immersion end thereof, and means for insulating said thermal elements from each other consisting of elongated members of ceramic material extending lengthwise of the interior of said tube, said members being arranged side by side between said thermal elements and engaging diametrically opposed sides of said tube, said members being entirely free of said tube, thermal elements and junction and capable of being readily withdrawn from said tube.

HARRY W. DIETERT.